United States Patent [19]

Malik

[11] 4,151,085
[45] Apr. 24, 1979

[54] WATER PURIFICATION SYSTEM

[76] Inventor: Lionel W. Malik, 7044 S. Cornell Ave., Chicago, Ill. 60649

[21] Appl. No.: 892,955

[22] Filed: Apr. 3, 1978

[51] Int. Cl.² ............................................. B01D 35/06
[52] U.S. Cl. ..................................... 210/101; 210/98; 210/134; 422/24
[58] Field of Search .................. 210/98, 101, 102, 134; 21/102 R, DIG. 2

[56] References Cited

U.S. PATENT DOCUMENTS

| | | | |
|---|---|---|---|
| 551,324 | 12/1895 | Kohlmeyer | 210/98 |
| 3,539,507 | 11/1970 | Woodbridge et al. | 210/8 |
| 3,791,790 | 2/1974 | Wyndhim et al. | 21/102 R |
| 3,825,494 | 7/1974 | Call et al. | 21/102 R |
| 3,948,772 | 4/1976 | Ellner | 210/101 |

*Primary Examiner*—John Adee
*Attorney, Agent, or Firm*—Hill, Gross, Simpson, Van Santen, Steadman, Chiara & Simpson

[57] ABSTRACT

A water purification system having a pre-filter, a series of germicidal radiation chamber filter units alternating with a series of mechanical filter units and having a flow measuring device affixed to the output part of a final mechanical filtering unit. The rate of flow through the series of alternating germicidal and mechanical filtering units being measured by the flow measuring device and in turn controlled by an electrically operated valve so as to keep the rate of flow, of water being purified, through the series of alternating germicidal and mechanical filters at some predetermined and optimal setting with respect to the efficaciousness of the germicidal filters.

14 Claims, 5 Drawing Figures

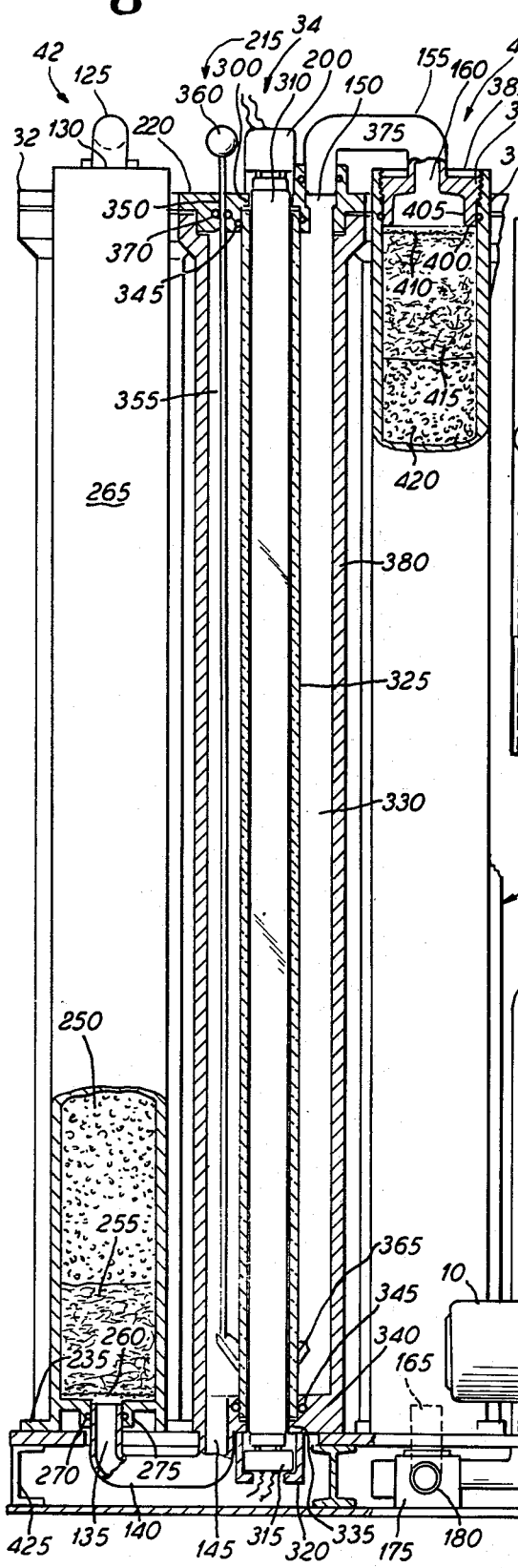
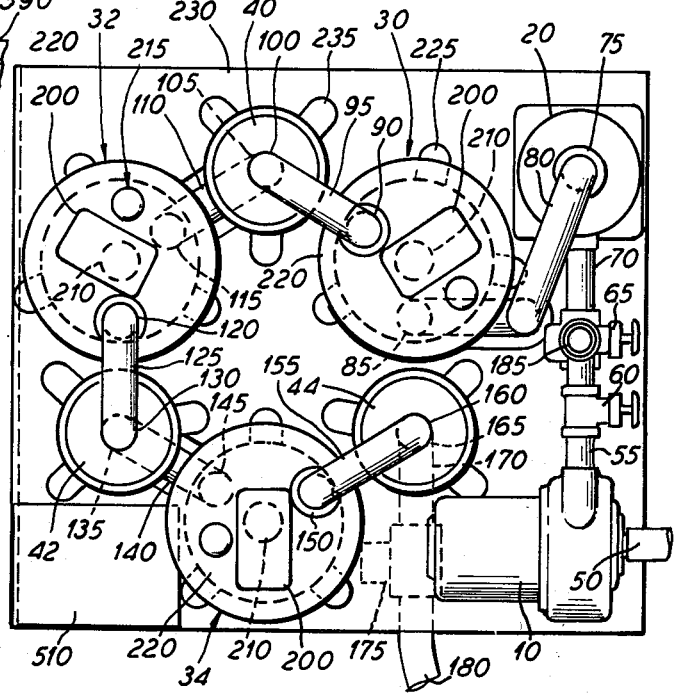
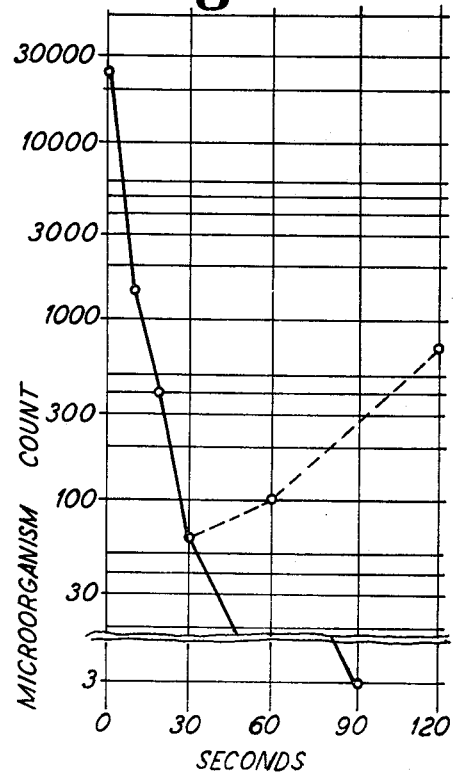

WATER PURIFICATION SYSTEM

BACKGROUND OF THE INVENTION

1. Field of the Invention

The invention relates to the field of water purification systems, in particular to inexpensive and portable water purification systems.

2. The Prior Art

It has been known in the prior art to use ultraviolet or germicidal lamps for the process of purifying water. Such apparatus has been disclosed in U.S. Pat. No. 3,462,597, granted to A. Young; U.S. Pat. No. 3,837,800, granted to M. Wood; U.S. Pat. No. 2,669,661, granted to M. Riddiford et al; U.S. Pat. No. 3,485,576, granted to W. A. McRae et al and U.S. Pat. No. 3,182,193 granted to S. Ellner et al; U.S. Pat. No. 3,174,819 granted to W. B. Clayton. The Wood patent discloses germicidal lamps in parallel, and the Young patent discloses a germicidal lamp having an operable wiper means. Further, U.S. Pat. No. 3,791,790 granted to J. Wyndhim and U.S. Pat. No. 3,539,507 granted to D. D. Woodbridge et al both disclose the use of filters in combination with an irradiator. The prior art also discloses in the Wyndhim patent the use of a pre-filter.

SUMMARY OF THE INVENTION

The invention is an inexpensive and portable water purification system which will bring about essentially 100 percent pure water with respect to micro-organisms measurable therein. The invention consists in combination of a pump, controllable flow valve, rust and particle filter, followed by a series of alternating germicidal and mechanical filters and a flow metering device. A very inexpensive and highly effective germicidal filter system results by closely controlling the rate of flow of fluid through the germicidal filter units such that approximately 30 seconds is required to flow through any given germicidal filter unit. This rate of time results in an optimal decrease in measurable micro-organisms per unit volume of fluid. Upon passing the fluid through a mechanical filter and then back into another germicidal filter for another 30 second time period, a further optimal reduction of micro-organisms per unit volume of fluid may be achieved. A flow rate which is either above or below the 30 seconds per germicidal filter unit results in a higher concentration of micro-organisms per unit volume at the output port of the purification system than is achievable by closely controlling the flow rate. Alternating three germicidal filter units with three mechanical filter units results in a unit of reasonable size, with mechanical filters having a reasonably long life, and with an inexpensive purification system which can utilize commonly available 30 watt germicidal bulbs.

For higher flow rates or water contaminated beyond the point that the basic system is unable to purify it, a second embodiment uses a substantially higher wattage germicidal bulb, hence, has enhanced purification characteristics.

The mechanical filters contain a combination of activated charcoal and aquarium floss.

BRIEF DESCRIPTION OF THE FIGURES

FIG. 1 is a top plan view of the packaged water purification system;

FIG. 2 is an enlarged fragmentary section taken along line II—II showing the relationship between a germicidal filter unit and two mechanical filter units;

FIG. 5 is a graph showing the effectiveness of the water purification system in terms of micro-organism count versus seconds of water flow through the germicidal chambers.

DESCRIPTION OF THE PREFERRED EMBODIMENT

Figures 3, 4:
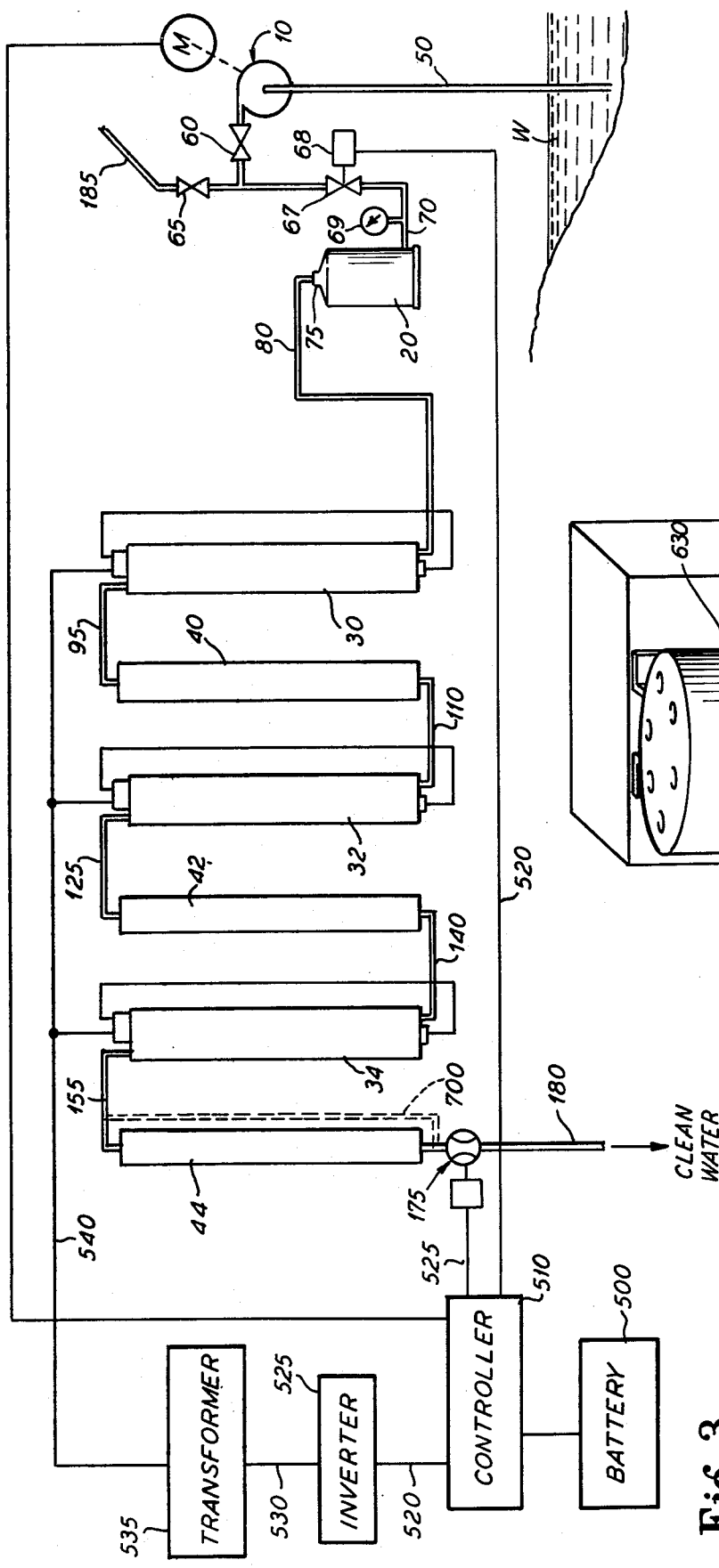
FIG. 3 is a schematic of the plumbing lay-out of the system with the valves, pump, filters, and general electrical connections indicated.
FIG. 4 is an enlarged fragmentary view of an alternate embodiment using a high wattage germicidal lamp.

While the principals of the present invention find a particular utility in a water purification system, it will be understood that the filtration and purification arrangement of the present invention may be utilized in other combinations. By way of exemplary disclosure of the best mode of practicing the invention there is shown generally in FIG. 1 a top view of a complete and packaged, portable and inexpensive water purification system. The system consists of a pump 10, a rust and particle pre-filter 20, a group of germicidal filter units 30, 32, 34, a group of mechanical filter units 40, 42, 44, as well as associated plumbing and electrical controls and wiring. As indicated by FIG. 1, an input port 50 is connected to the pump 10 which in turn is connected by a pipe 55 with a shut-off valve 60, an alternate input port 65 and a pipe 70 into the pre-filter 20. The pre-filter 20 is a rust and particle removing filter of a conventional variety. The pre-filter 20 is connected by an output port 75 and a pipe 80 to an input port 85 of the first of the ultraviolet or germicidal filter units 30. An output port 90 of the first of the germicidal filter units 30 is connected by a pipe 95 to an input port 100 of the first of the mechanical filter units 40. An output port 105 of the first of the mechanical filter units 40 is connected by a pipe 110 to an input port 115 of the second of the germicidal units 32. An output port 120 of the second of the germicidal filters 32 is connected by a pipe 125 to an input port 130 of the second of the mechanical filter units 42. An output port 135 of the second of the mechanical filter units 42 is connected by a pipe 140 to an input port 145 of the third of the germicidal filter units 34. An output port 150 of the third of the germicidal filter units 34 is connected by a pipe 155 to an input port 160 of the third of the mechanical filter units 44. An output port 165 of the third of the mechanical filter units 44 is connected by a pipe 170 to a flow metering device 175 and finally to an output port 180.

The flow of water through the purification system of FIG. 1 is from either input port 50 if a source which requires pumping is being used or through an input port 185 on the valve 65 in the case of a source of water which already has a head of pressure associated with it. The flow is then through the particle or rust pre-filter 20, the alternating germicidal filters 30, 32, 34 and mechanical filters 40, 42, 44 the flow metering device 175 and then to the output port 180 as purified water. Each of the germicidal filter units 30, 32 and 34 has associated with it a housing 200 for making electrical connections to the germicidal lamp 210 contained within each of the three germicidal filter units 30, 32, and 34. Further, each of the germicidal filter units 30, 32 and 34 has a scraper unit 215 which is mounted through the top plate 220 of each of the filter units. Each of the germicidal filter units 30, 32, 34 has a set of brackets 225 which anchor the germicidal filter units 30, 32, 34 to a base plate 230.

Each of the mechanical filter units 40, 42 and 44 has an associated set of brackets 235 which are used to affix the mechanical filters to the base plate 230. Additionally, the pre-filter 20 and the pump 10 are also affixed to the base plate 230 in a conventional fashion. All of the pipes such as 55, 70, 80, 95 disclosed herein are intended to be manufactured from some suitable water-resistant material, such as stainless steel or a suitable plastic. The valves 60 and 65 are also intended to be valves of a type conventionally used with water purification and distribution systems.

FIG. 2, a planar section taken along line II—II is a fragmentary enlarged section showing the interrelationships between the mechanical filter units 42 and 44 and the germicidal filter unit 34, as well as the structure of the interior of the mechanical filters 42, 44, and the germicidal filter 34. Water being purified comes into the mechanical filter unit 42 at the port 130 by means of the pipe 125. Having passed through mechanical filter 42, the liquid passes out of the filter unit at the output port 135 through the pipe 140 into the input port 145 of the germicidal filter unit 34. Rising through the top of the germicidal filter unit 34 the fluid passes out of the output port 150 through the pipe 155 and back into the last mechanical filter unit 44 having the input port 160. Finally, after falling through to the bottom of the mechanical filter unit 44 the purified water passes through the output port 165 through the flow meter 175 and into the output port 188 for use or distribution.

As the fragmentary portion of FIG. 2 indicates, the mechanical filter units 40, 42, 44 have within them a composition of activated charcoal 250 and glass wool or aquarium floss 255 of a standard variety. At the bottom of the mechanical filter unit 42 is a screen 260 to retain the glass wool 255 within the housing 265 of the mechanical filter 42. The outport port 135 of the mechanical filter unit 42 has associated with it an O-ring 270 which provides a seal between a flange 275 of the housing 265 of the mechanical filter unit 42 and the pipe 140. At the input port 145 to the germicidal filter unit 34 the connection between the pipe 140 and the germicidal filter unit 34 may be made in any conventional waterproof fashion. The cover 220 of the germicidal filter unit 34 is removable for cleaning and maintenance purposes. Extending through a port 300 in the cover 220 of the germicidal filter unit 34 is the germicidal bulb 310. The bulb 310 is a standard 30 or 15, or 45 watt germicidal bulb well known in the art receiving electrical power through the connection 200 and a connection 315. The connection 315 is supported by a flange 320 in the base plate 230 such that the socket 315 may be removed if necessary for maintenance purposes. The germicidal light 310 is about 35 inches long with a one inch diameter. Surrounding the germicidal lamp 310 is a protective shield 325 whose purpose is to insulate the lamp 310 from the temperature differential which may exist in the fluid flowing through the cavity 330 within the germicidal filter unit 34. The shield 325 may be left out if there is no variation between the temperature of the bulb 310 and the fluid in the cavity 330. The composition of the shield 325 is of a standard variety of a type of material which does not inhibit the passage of the ultraviolet germicidal waves. The port 300 at the top plate 220 of the germicidal filter 34 and a port 335 at the base 340 of the germicidal filter 34 are sealed with O-rings 345 of a conventional and known type. In order to keep the bulb 310 or the shield 325 around the bulb 310 clean there is provided a scraper unit 215 which extends through a port 350 in the top plate 220 of the germicidal unit 34. The scraper 215 is composed of a shaft 355 having an operating knob 360 affixed to the shaft 355 and a scraper 365 within the cavity 330 operative to scrape the shield 325 or the lamp 310 directly so as to minimize build-up of any material thereon. An O-ring 370 provides a seal between the shaft 355 and the top plate 220 of the germicidal unit 34. An O-ring 375 provides a seal between the output port 150 of the germicidal filter 34 and the pipe 155. The upper plate 220 of the germicidal unit 34 is removably affixed to the top of the tubular body 380 of the germicidal unit 34. As is apparent from FIG. 2, the germicidal unit may be completely disassembled for cleaning and maintenance.

The mechanical filter 44 has a removable top 385 removably affixed to the body 390 of the mechanical filter 44 by a set of threads 395. An O-ring 400 in the body 390 of the mechanical filter unit 44 provides a seal between the body 390 and a flange 405 connected to the pipe 155 in a standard fashion. The interior of the mechanical filter 44 is filled with a screen 410 on top of glass wool 415 which is on top of activated charcoal 420. The structure and composition of the glass wool 415 and charcoal 420 in the mechanical filter 44 is analogous to the composition or structure of an aquarium filter using glass wool and charcoal. FIG. 2 further illustrates the flow metering device 175 with the output port 180.

The plate 230 upon which the filters and pump are mounted is supported by a pair of brackets 425 on top of a lower base plate 430 providing a protected volume of space such that the plumbing and electrical connections may be made without fear of damage when the unit is moved from place to place.

FIG. 3, a schematic diagram of the water purification system illustrates both the plumbing connections, the interrelationship between the filters, and the necessary electrical connections. The pump 10 is indicated with the input port 50 being connected to a body of water W having the valve 60 which is in turn connected to the valve 65 for use with a supplementary water supply through the input port 185 when the pump 10 is not needed. The flow control valve 67, the flow control valve actuator 68 and the flow meter 69 are all illustrated connected via the pipe 70 to the rust and particle filter 20. The output port 75 of the filter 20 is connected by the pipe 80 to the first of the germicidal filters 30 which is in turn connected by the pipe 95 to the first of the mechanical filters 40. The mechanical filter 40 is connected by the pipe 110 to the germicidal filter 32, which is in turn connected by the pipe 125 to the next mechanical filter 42. The mechanical filter 42 is connected by the pipe 140 through the germicidal filter 34 which is in turn connected by the pipe 155 to the last mechanical filter 44 which is connected to the flow monitoring device 175 and then to the output port 180. To provide electrical power, a battery 500 is connected to a control mechanism 510 of a conventional variety which senses the rate of flow from the flow monitoring device 175 by a connection 515 and in turn by a second connection 520 signals the flow meter adjusting device 68 which in turn operates the valve 67. The controller 510 provides a source of switched DC power via a connection 520 to a DC to AC inverter 525 which in turn is connected by a connection 530 through a transformer 535, through a connection 540 to each of the germicidal lights in the germicidal filters 30, 32, 34. The electrical connections indicated with respect to the controller 510, the DC to AC inverter 525, the transformer 535 and the germicidal lamps in each of the germicidal filters 30, 32 and 34 are of a conventional variety well known in the art.

FIG. 4, a fragmentary enlarged view discloses a second embodiment of the germicidal filter units. In FIG. 4 a high wattage, 1300 to 1500 watt, ultraviolet lamp 600 is shown surrounded by a protective quartz sleeve 610 of a conventional variety having a thickness of approximately 2 millimeters. The germicidal lamp 600 is mounted in a glass column 620 which forms the body of the germicidal filter unit of this embodiment. The lamp 610 is powered through a plug unit of a conventional variety 630. The body of the germicidal filter 620 has an output port 640 corresponding to the output ports of the germicidal filter units of FIGS. 1 and 2. In order to evenly distribute the flow of water around the germicidal filter unit 620 there are affixed within the body 620 a series of vanes 650. The embodiment of FIG. 4 is intended to be used where a much higher degree of ultraviolet radiation is required than in the initial embodiment with an expected flow rate of 25 GPM.

It is an important point of this invention that the flow rate through the combined filter structures be totally controlled. FIG. 5 is a semi-logarithmic plot showing micro-organism count per unit volume as the water flows through the first of the ultraviolet filter of FIG. 1. If an initial count of approximately 25,000 micro-organisms per unit of volume is measured and if a given volume of water is within the tank 30 for 30 seconds, as can be seen from FIG. 5, the final count of micro-organisms per volume is between 60 and 100. The dashed line on FIG. 5 indicates the effect of permitting the volume to remain within the tank 30 for a longer period of time than 30 seconds (the regrowth or reactivation time). Whereas initially, the effect of the ultraviolet radiation from the 30 watt bulb within the germicidal filter unit 30 is to drastically reduce the micro-organism count per unit volume, beyond 30 seconds as is indicated by the dash line of FIG. 5, the micro-organism count begins to increase. At 60 seconds it has increased to 100 micro-organisms per unit volume and at 120 seconds it is approximately at 700 micro-organisms per unit volume. Thus, it can be seen, it is essential for highly purified water to insure that a continual flow rate exists such that a given volume of water will not be present in any one of the germicidal filter units for longer than 30 seconds. FIG. 5 also indicates the results of another test where the initial micro-organism count per unit volume was about 61,000. The effect of running the water to be purified through the three germicidal filter units corresponding to the water having been within the germicidal filter units for a period of 90 seconds was to reduce the micro-organism count per unit volume to three. As a result, there is a substantial reduction in micro-organisms per unit volume to be achieved by interspersing the germicidal units with the mechanical units which provide a filtering and a cleaning medium for the water being purified in between germicidal units, and also by maintaining a closely controlled flow rate. The preferred embodiment has mechanical filters approximately 34 inches in height with a diameter of 2½ inches, and germicidal filter units with essentially the same effective interval volume, and a flow rate of 1½ gallons per minute.

The advantage of alternating the mechanical filter units 40, 42, and 44 with the germicidal filters 30, 32, and 34 lies in the fact that the mechanical filter may be made relatively small but still kept at a sufficient size so as not to impede the water flow. Further, the inexpensive and easily available 30 watt germicidal bulbs may be used. And, finally, the alternating system prolongs the life of the mechanical filters particularly, the last mechanical filter. If a single mechanical filter is used, that filter in fact becomes a breeding ground for further micro-organisms resulting in its fairly early contamination. However, by using several mechanical filters, the mechanical filters after the very first unit because of the great decrease in micro-organisms in the water being purified by the first germicidal unit have a longer life time before contamination greater than a single mechanical filter would having twice or three times the filtration capacity of the individual filters used in series. By using three mechanical filters in series, and alternating the germicidal filters with the mechanical filters, the life span of the mechanical filters becomes long enough that they are practical for use in purifying highly contaminated water in areas where full time maintenance of the purification system may not be possible. If desired the last mechanical filter 44 could be eliminated with the bypass 700, or left off completely.

Although various modifications might be suggested by those skilled in the art, it should be understood that I wish to embody within the scope of the patent warranted hereon all such modifications as reasonably and properly come within the scope of my contribution to the art.

I claim as my invention:
1. A water purification system comprising:
a plurality of germicidal filters;
a plurality of mechanical filters;
flow measurement and control means; electrical means;
the members of said plurality of germicidal filters and the members of said plurality of mechanical filters being connected operably in series, with each of said members of said plurality of germicidal filters being alternately and operatively connected to at least one of said members of said plurality of mechanical filters, said alternating connection of germicidal and mechanical filters being further interconnected to said flow measurement and control means; said flow measurement and control means being operable to sense and regulate the rate of flow through said interconnected plurality of germicidal filters and said plurality of mechanical filters to achieve the optimal purification effect from each of said filter units; said electrical means being operably connected to at least said plurality of germicidal filters.

2. The water purification system according to claim 1 with said flow measurement and control means being operable to achieve the optimal purification effect from each said member of said plurality of germicidal filter units.

3. A water purification system comprising:
control means; electrical means;
a plurality of germicidal filters, each member of which having an input port and an output port;
a plurality of mechanical filters, each member of which having an input port and an output port;
said plurality of mechanical filters having a first member;
said plurality of germicidal filters having a first member;

said output port of each said member of said plurality of germicidal filter units being connected to the said input port of a corresponding said member of said plurality of mechanical filters; said output port of each said member of said plurality of mechanical filters, except for said first member of said plurality of mechanical filters, being connected to said input port of a corresponding said member of said plurality of germicidal filters except for said first member of said plurality of germicidal filters; said control means being operably connected to said interconnected members of said plurality of mechanical filters and said plurality of germicidal filters and operable to control the rate of flow through said interconnected members of said plurality of mechanical filters and said plurality of germicidal filters at some predetermined rate; said electrical means being operably connected to at least said plurality of germicidal filters.

4. The water purification system according to claim 3, having said control means operably connected so as to sense the rate of flow at said output port of said first member of said plurality of mechanical filters and so as to adjust the rate of flow at said input port of said first member of said plurality of germicidal filters so as to maintain the rate of flow at said output port of said first member of said plurality of mechanical filters at some predetermined value.

5. A water purification system comprising:
a pump; electrical means;
flow control means;
a rust filter, a plurality of germicidal filters each member of said plurality having an input port and output port;
a plurality of mechanical filters each member of said plurality having an input port and an output port;
flow measuring means;
said pump being operably connected to said flow control means, said flow control means being operably connected to said rust filter, said rust filter being operably connected to said input port of a first member of said plurality of germicidal filters;
said output ports of said members of said plurality of germicidal filters each being connected to a said input port of a corresponding member of said plurality of mechanical filters;
a first member of said plurality of mechanical filter units having a said output port operably connected to said flow measuring means; each of said members of said plurality of mechanical filters, except for said first member, having a said output port connected to a said input port of a said corresponding member of said plurality of germicidal filters; said flow measuring means being operably connected to said flow control means so as to adjust the rate of flow through said plurality of interconnected mechanical and germicidal filters to some predetermined rate; said electrical means being operably connected at least to said plurality of germicidal filters.

6. The water purification system of claim 5 wherein said electrical means comprises a source of battery operated power, battery current to alternating current coverter means, transformer means, said electrical means being further operably connected to said flow measurement means, to said flow control means; and to said pump.

7. The water purification system according to claim 5 wherein each said member of said plurality of mechanical filters comprises a housing having an interior region containing activated charcoal and glass wool 8. The water purification system according to claim 5 wherein each said member of said plurality of germicidal filters comprises a housing having an interior region containing a lamp which upon being energized electrically emits radiation effective for purifying a fluid bearing micro-organisms also contained within said housing.

9. The water purification system according to claim 8 with each said housing having a cylindrical shape and each said lamp having a cylindrical shape.

10. The water purification system according to claim 8 wherein the effective volume within said interior region of each of said housings corresponds substantially to the effective volume within each member of said plurality of mechanical filters.

11. A water purification system comprising a polluted water inlet to a first mechanical filter, a fluid outlet from the first mechanical filter to a fluid inlet to a first germicidal filter, a fluid outlet from the first germicidal filter to a fluid inlet to a second mechanical filter, a fluid outlet from the second mechanical filter to a fluid inlet to second germicidal filter, a fluid outlet from the second germicidal filter to a fluid inlet to a third mechanical filter, a fluid outlet from the third mechanical filter to a fluid inlet to a third germicidal filter, a fluid outlet from the third germicidal filter to a fluid inlet to a fourth mechanical filter, a purified water outlet from the fourth mechanical filter, the first mechanical filter being a rust filter, the germicidal filters comprising elongated tubes having centrally disposed therein germicidal lamps and a flow path through said tubes intermediate an interior surface of said tube and said germicidal lamp, the flow path in each tube being axial from opposite end located fluid inlet and fluid outlet, the second, third and fourth mechanical filters being axial flow tubes having at least a portion of the tube being filled with a mechanical filtering media.

12. The system of claim 11, wherein said purification system includes a flow rate control means controlling flow of liquid therethrough such that quanta of water entering each germicidal filter remains in that germicidal filter exposed to said lamp for a time period less than a reactivation time period during which micro-organisms contained in the quanta would be reduced to a minimum and begin increasing in number and where the total time period which each quanta of water passing through the entire purification system is contained within germicidal filters is greater than the reactivation time period.

13. The water purification system according to claim 2, wherein said optimal purification effect from each said member of said plurality of germicidal filter units is achieved by said control means regulating the flow such that a quanta of water entering each said member of said plurality of germicidal filters remains in that said germicidal filter, exposed to the germicidal effects thereof for a time period less than a reactivation time period during which micro-organisms contained in the quanta would be reduced to a minimum and begin increasing in number and where the total time period which each quanta of water passing through the entire purification system is contained within said plurality of germicidal filters is greater than the regrowth time period.

14. A water purification system comprising:

a pump;
electrical means;
flow control means;
a particle filter, a plurality of germicidal filters each member of said plurality having an input port and an output port;
a plurality of mechanical filters each member of said plurality having an input port and an output port;
flow measuring means;
said pump being operably connected to said flow control means, said flow control means being operably connected to said particle filter, said particle filter being operably connected to said input port of the first member of said plurality of germicidal filters;
said output ports of said members of said plurality of germicidal filters, except for a first member thereof, each being connected to a said input port of a corresponding member of said plurality of mechanical filters;
said first member of said plurality of germicidal filter units having a said output operably connected to said flow measuring means;
each of said members of said plurality of mechanical filters having a said output port connected to a said input port of a said corresponding member of said plurality of germicidal filters;
said flow measuring means being operably connected to said flow control means so as to adjust the rate of flow through said plurality of interconnected mechanical and germicidal filters to some predetermined rate;
said electrical means being operably connected at least to said plurality of germicidal filters.

* * * * *